United States Patent Office 3,444,139
Patented May 13, 1969

3,444,139
PREPARATION OF HIGHLY POLYMERIC POLYESTERS IN THE PRESENCE OF CATALYTIC TITANIUM COMPOUNDS CONTAINING ESTER GROUPS
Lambert Gaston Jeurissen, Mortsel-Antwerp, and André Jan Conix, Antwerp, Belgium, assignors to Gevaert-Agfa N.V., Mortsel-Antwerp, Belgium, a Belgian company
No Drawing. Filed Mar. 10, 1966, Ser. No. 533,270
Claims priority, application Great Britain, Mar. 11, 1965, 10,409/65
Int. Cl. C08g *17/015*
U.S. Cl. 260—75
9 Claims

ABSTRACT OF THE DISCLOSURE

Highly polymeric polyesters are obtained from an aromatic dicarboxylic acid or an ester-forming derivative thereof and a glycol by (I) forming a glycol dicarboxylate from the above-mentioned starting materials, and (II) polycondensing the glycol dicarboxylate in the presence of a titanium compound of the formula $Ti(OOC-R-COOR_1)_4$, wherein R represents an aliphatic, aromatic, cyclo-aliphatic or heterocyclic bivalent organic radical and $R_1$ represents an aliphatic or aromatic monovalent organic radical.

---

The invention relates to improvements in the manufacture of polyesters, in particular highly polymeric polyethylene terephthalate.

Highly polymeric polyethylene terephthalate has great value as fibre and film material. In general it is made by ester-interchange reaction between an ester of terephthalic acid and ethylene glycol whereby bis(beta-hydroxyethyl) terephthalate is formed. This compound is then polycondensed under reduced pressure and at high temperature.

The prior art contains a large number of disclosures regarding the use of catalysts in the manufacture of fibre and film-forming linear condensation-type polyester. Among numerous useful catalysts for preparing polyesters are zinc acetate, antimony trioxide, titanium compounds such as titanium tetrafluoride, titanium dioxide, alkyl and aryl titanates, titanium tetrachloride, titanium dichloride diacetate and compounds of other metals.

According to the invention an improved process is provided for the manufacture of highly polymeric polyesters, obtained by reacting a glycol with an aromatic dicarboxylic acid or an ester-forming derivative thereof and polycondensing the resulting glycol dicarboxylate, characterised in that at least during the polycondensation step a titanium compound is present, which is soluble in the reaction mixture and has the formula $$Ti(OOC-R-COOR_1)_4$$

wherein:
R represents an aliphatic, aromatic, cycloaliphatic or heterocyclic organic bivalent radical, and
$R_1$ represents an aliphatic or aromatic monovalent organic radical.

These titanium compounds are useful for the catalysis of both ester-interchange and polycondensation reaction.

If preferred, any other ester-interchange catalyst such as zinc acetate, or a mixture of such substances may be used as the ester-interchange catalyst, whereas the titanium compounds of the invention are used as the polycondensation catalysts. Alternatively the titanium compounds may be used as catalysts, especially in the polycondensation step, together with other known polycondensation catalysts or mixtures thereof.

Among the titanium compounds, which are suited for being used as catalysts according to the invention, can be named titanium tetra(monomethyl terephthalate), titanium tetra(monomethyl isophthalate), titanium tetra(monoethyl adipate), titanium tetra(monomethyl pyridine-2,5-dicarboxylate), and the like.

The use of the titanium compounds as catalysts in the preparation of high molecular weight linear polyesters presents various improvements in comparison to the catalysts proposed in the prior art.

During heating of the reaction mixture the titanium catalysts are decomposed. If they are derived from the same dicarboxylic acid or acids as used for the preparation of the polyester, for instance terephthalic acid, the residues obtained are of the same chemical structure as those composing the polymer chain. In case any ester-interchange reaction should occur with the catalyst, this avoids the introduction in the polymer chain of residues having a different chemical structure. Nevertheless, in view of the fact that the catalyst is used in relatively small amounts, it is not essential that the titanium catalyst should derive from the same dicarboxylic acid.

A very small amount of titanium compound according to the invention suffices to effectively catalyse the ester-interchange and/or the polycondensation reaction. This small amount constitutes a further improvement over the prior art. Indeed, the colouration of the polyesters is in general proportional to the total amount of catalyst added and since with the present organometallic titanium catalysts a very small quantity as indicated suffices, polyesters of less colouration are obtained.

The known antimony catalysts in general give polyesters with relatively low melting points. Further their catalytic action is relatively slow. The titanium compounds of the present invention, however, are much more active in catalysing the ester-interchange and/or polycondensation, and at the same time give polyesters with much higher melting points indicating a low diethylene glycol content, and resulting in a higher modulus of elasticity of the films manufactured from the polyester obtained.

Although the description and statements of the invention have especial interest in view of the use of the novel catalysts in the preparation of polyethylene terephthalate, the titanium compounds can, in general, be employed in the preparation of all polyesters involving an ester-interchange reaction with a dicarboxylic acid ester, for instance a pyridine dicarboxylic acid ester, or mixtures of different dicarboxylic acid esters and a glycol, mixtures of glycols, or other diols such as cyclohexane dimethanols, followed by polycondensation of the resulting glycol and/or diol dicarboxylates.

The titanium compounds do not interfere with stabilising agents such as those phosphates or phosphites that are known to be added to the polycondensation reaction mixture.

The following examples are cited to illustrate the invention. They are not intended to limit it in any way. In these examples the inherent viscosity $\eta_{inh}$, which is a measure of the degree of polycondensation, is determined at 25° C. at a concentration of 0.5 gram per 100 cc. in a 60:40 mixture of phenol and sym.-tetrachloroethane. $\eta_{inh}$ is calculated from the equation $\eta_{inh} = \ln \eta_{rel}/c$ wherein $\eta_{rel}$ is the relative viscosity and equals the ratio

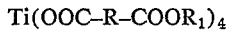

and c is the concentration (0.5).

The crystalline melting point is determined by heating a crystallised sample of polyester on the heating stage of a polarising microscope. The temperature of the hot stage is raised at a rate of 0.8° C./min. The crystalline melting point is obtained by noting the temperature at which between crossed nicols the last trace of birefringence disappears.

At the end of the polycondensation period the colour of the molten polyester is visually compared with arbitrary colour standards consisting of aqueous solutions of Du Pont Pontamine Catechu 3G dye (C.I. 36,300) according to the following system of colour ratings:

0=pure water
1=0.00025 g. of the above dye dissolved in 100 ml. of water
2=twice as much dye as in 1
3=three times as much dye as in 1
4=four times as much dye as in 1
5=etc.

Example 1

In a polymerization tube 1 mole of monomethyl terephthalate and ¼ mole of titanium tetrachloride are heated at 255° C. under a nitrogen atmosphere. A rather vigorous reaction occurs. The melt obtained is not clear but is turbid grey and gradually solidifies. The reaction mixture is kept at 255° C. for 2 hrs. Then the fully solid product is cooled and pulverised. The resulting titanium tetra(monomethyl terephthalate) produced is a lightly grey product.

38.8 parts of dimethyl terephthalate (0.2 mole and 27.3 parts of ethylene glycol (0.44 mole) are placed in a 25 mm. inside diameter glass polymerization tube, and 61.2 mg. of titanium tetra(monomethyl terephthalate) ($4.10^{-4}$ mole/mole of dimethyl terephthalate), as prepared above, are added. The reactants are heated at 197° C. for 1 hr. at atmospheric pressure, whilst a continuous stream of dry nitrogen is introduced through a capillary tube reaching to the bottom of the reaction tube. The ester-interchange being finished, the temperature is gradually raised to 282° C. over 30 min. and the unreacted ethylene glycol distilled off. The pressure is reduced to 0.1 to 0.3 mm. of Hg, while bubbling dry nitrogen through the melt. After 3 hr. at 282° C., vacuum is released and polyethylene terephthalate polyester is obtained having an inherent viscosity $\eta_{inh}$ ($c=0.5$)=0.61. The polyester is clear, has a colour number of 10, and melts at 262.5° C., which indicates a low diethylene glycol content.

Example 2

38.8 parts of dimethyl terephthalate (0.2 mole) and 27.3 parts of ethylene glycol (0.44 mole) are placed in a 25 mm. inside diameter glass polymerization tube, and 30.6 mg. of titanium tetra(monomethyl terephthalate) ($2.10^{-4}$ mole/mole of dimethyl terephthalate), as prepared in Example 1, are added. The reactants are heated at 197° C. for 2½ hr. at atmospheric pressure, whilst a continuous stream of dry nitrogen is introduced through a capillary tube reaching to the bottom of the reaction tube. The ester-interchange being finished, the temperature is gradually raised to 282° C. over 30 min. and the unreacted ethylene glycol distilled off. The pressure is reduced to 0.1 to 0.3 mm. of Hg, while bubbling dry nitrogen through the melt. After only 2 hr. at 282° C., vacuum is released and polyethylene terephthalate polyester is obtained having an inherent viscosity $\eta_{inh}$ ($c=0.5$)=0.60. The polyester is clear, has a low colour number of 7, and melts at 264° C., which indicates a low diethylene glycol content.

Example 3

38.8 parts of dimethyl terephthalate (0.2 mole) and 27.3 parts of ethylene glycol (0.44 mole) are placed in a 25 mm. inside diameter glass polymerization tube, and 15.3 mg. of titanium tetra(monomethyl terephthalate) ($1.10^{-4}$ mole/mole of dimethyl terephthalate), as prepared in Example 1, are added. The reactants are heated at 197° C. for 2½ hr. at atmospheric pressure, whilst a continuous stream of dry nitrogen is introduced through a capillary tube reaching to the bottom of the reaction tube. The ester-interchange being finished, the temperature is gradually raised to 282° C. over 30 min. and the unreacted ethylene glycol distilled off. The pressure is reduced to 0.1 to 0.3 mm. of Hg, while bubbling dry nitrogen through the melt. After 3 hr. at 282° C., vacuum is released and polyethylene terephthalate polyester is obtained having an inherent viscosity $\eta_{inh}$ ($c=0.5$)=0.58. The polyester is clear and has a colour number of 8.

Example 4

38.8 parts of dimethyl terephthalate (0.2 mole) and 27.3 parts of ethylene glycol (0.44 mole) are placed in a 25 mm. inside diameter glass polymerization tube, and 30.6 mg. of titanium tetra(monomethyl isophthalate) ($2.10^{-4}$ mole/mole of dimethyl terephthalate) are added. The titanium tetra(monomethyl isophthalate) is prepared in the same manner as the titanium tetra(monomethyl terephthalate) of Example 1. The reactants are heated at 197° C. for 2½ hr. at atmospheric pressure, whilst a continuous stream of dry nitrogen is introduced through a capillary tube reaching to the bottom of the reaction tube. The ester-interchange being finished, the temperature is gradually raised to 282° C. over 30 min. and the unreacted ethylene glycol distilled off. The pressure is reduced to 0.1 to 0.3 mm. of Hg, while bubbling dry nitrogen through the melt. After 3 hr. at 282° C., vacuum is released and polyethylene terephthalate polyester is obtained having an inherent viscosity $\eta_{inh}$ ($c=0.5$)=0.58. The polyester is clear and has a colour number of 9.

Example 5

38.8 parts of dimethyl terephthalate (0.2 mole) and 27.3 parts of ethylene glycol (0.44 mole) are placed in a 25 mm. inside diameter glass polymerization tube, and 29.4 mg. of titanium tetra(monoethyl adipate) ($2.10^{-4}$ mole/mole of dimethyl terephthalate) are added. For its manufacture an analogous process as that described in Example 1 for titanium tetra(monomethyl terephthalate) is followed. The reactants are heated at 197° C. for 2½ hr. at atmospheric pressure, whilst a continuous stream of dry nitrogen is introduced through a capillary tube reaching to the bottom of the reaction tube. The ester-interchange being finished, the temperature is gradually raised to 282° C. over 30 min. and the unreacted ethylene glycol distilled off. The pressure is reduced to 0.1 to 0.3 mm. of Hg, while bubbling dry nitrogen through the melt. After 3 hr. at 282° C., vacuum is released and polyethylene terephthalate polyester is obtained having an inherent viscosity $\eta_{inh}$ ($c=0.5$)=0.56. The polyester is clear and has a colour number of 11.

Example 6

38.8 parts of dimethyl terephthalate (0.2 mole) and 27.3 parts of ethylene glycol (0.44 mole) are placed in a 25 mm. inside diameter glass polymerization tube, and 28.5 mg. of titanium tetra(monomethylpyridine-2,5-dicarboxylate) ($2.10^{-4}$ mole/mole of dimethyl terephthalate) are added. This titanium compound is manufactured analogously to the titanium tetra(monomethyl terephthalate) of Example 1. The reactants are heated at 197° C. for 2½ hr. at atmospheric pressure, whilst a continuous stream of dry nitrogen is introduced through a capillary tube reaching to the bottom of the reaction tube. The ester-interchange being finished the temperature is gradually raised to 282° C. over 30 min. and the unreacted ethylene glycol distilled off. The pressure is reduced to 0.1 to 0.3 mm. of Hg, while bubbling dry nitrogen through the melt. After 3 hr. at 282° C., vacuum is released and polyethylene terephthalate polyester is obtained having an inherent viscosity $\eta_{inh}$ ($c=0.5$)=0.59. The polyester is clear and has a colour number of 12.

Example 7

388 parts of dimethyl terephthalate and 275 parts of ethylene glycol are placed in a stainless steel autoclave equipped with a stirrer, a gas inlet tube and a rectifying column. After adding 200 mg. of titanium tetra(monomethyl terephthalate) (for preparation see Example 1), the mixture is stirred and heated at 197° C. for 3 hr. at atmospheric pressure, whilst a continuous stream of dry nitrogen is introduced. The ester-interchange being finished, the temperature is gradually raised to 282° C. over 1 hr. and the unreacted ethylene glycol distilled off. The pressure is reduced to 0.1 to 0.3 mm. of Hg. After 3 hr. at 282° C., vacuum is released and polyethylene terephthalate polyester is obtained having an inherent viscosity $\eta_{inh}$ ($c=0.5$)=0.62. The polyester is clear and has a colour number of 8.

Example 8

38.8 parts of dimethyl terephthalate (0.2 mole) and 27.3 parts of ethylene glycol (0.44 mole) are placed in a 25 millimeter inside diameter glass polymerization tube, whereupon 3.1 mg. of titanium tetra(monomethyl terephthalate) ($2.10^{-5}$ mole/mole of dimethyl terephthalate) together with 1.7 mg, of zinc di(monomethyl terehpthalate) ($2.10^{-5}$ mole/mole of dimethyl terephthalate) are added. The reactants are heated for 4 hours at 197° C. at atmospheric pressure. A continuous stream of dry nitrogen is introduced through a capillary tube reaching to the bottom of the reaction tube. The ester-interchange being finished, the temperature is gradually raised over 30 min. to 282° C. and the unreacted ethylene glycol distilled off. Then 2.6 mg. of triphenyl phosphate ($4.10^{-5}$ mole/mole of dimethyl terephthalate) is added as stabilizer. The pressure is reduced to 0.1 to 0.3 millimeter of Hg, while the reaction mixture is stirred under dry nitrogen. After 4 hours at 282° C., vacuum is released and polyethylene terephthalate polyester is obtained having an inherent viscosity 0.64. The polyester is clear and has a light colour number 5.

Example 9

38.8 parts of dimethyl terephthalate (0.2 mole) and 27.3 parts of ethylene glycol (0.44 mole) are placed in a 25 millimeter inside diameter glass polymerization tube, whereupon 3.1 mg. of titanium tetra(monomethyl terephthalate) ($2.10^{-5}$ mole/mole of dimethyl terephthalate) together with 1.7 mg. of zinc di(monomethyl terephthalate) ($2.10^{-5}$ mole/mole of dimethyl terephthalate) are added. The reactants are heated for 4 hours at 197° C. at atmospheric pressure. A continuous stream of dry nitrogen is introduced through a capillary tube reaching to the bottom of the reaction tube. The ester-interchange being finished, the temperature is gradually raised over 30 min. to 282° C. and the unreacted ethylene glycol distilled off. The pressure is reduced to 0.1 to 0.3 millimeter of Hg, while the reaction mixture is stirred under dry nitrogen. After 4 hours at 282°, vacuum is released and polyethylene terephthalate polyester is obtained having an inherent viscosity 0.62. The polyester is clear and has a light colour number 6.

What we claim is:

1. In a process for the manufacture of highly polymeric film forming polyesters in which (I) a glycol is reacted with a compound selected from the group consisting of an aromatic dicarboxylic acid and an ester-forming derivative thereof, and (II) the resulting glycol dicarboxylate is condensed to form the polyester, the improvement comprising the use in catalytic amounts at least during the polycondensation step of a titanium catalyst soluble in the reaction mixture and possessing the formula $$Ti(OCC-R-COOR_1)_4$$

wherein R is selected from the group consisting of (aliphatic, aromatic, cycloaliphatic, and heterocyclic bivalent organic radicals) an alkylene radical of 4 carbon atoms, a phenylene radical, and a bivalent pyridine moiety, and $R_1$ is selected from the group consisting of aliphatic and aromatic monovalent organic radicals.

2. A process according to claim 1 in which the glycol is ethylene glycol.

3. A process according to claim 1 in which the aromatic dicarboxylic acid is terephthalic acid.

4. A process according to claim 1 in which ester-interchange occurs between ethylene glycol and dimethyl terephthalate to form bis(2-hydroxy ethyl) terephthalate.

5. A process according to claim 1 in which the titanium catalyst is titanium tetra(monomethyl terephthalate).

6. A process according to claim 1 in which the titanium catalyst is titanium tetra(monomethyl isophthalate).

7. A process according to claim 1 in which the titanium catalyst is titanium tetra(monoethyl adipate).

8. A process according to claim 1 in which the titanium catalyst is titanium tetra(monomethylpyridine-2,5-dicarboxylate).

9. A process according to claim 1 in which the titanium catalyst is present in proportions of from about $2.10^{-5}$ mole to $4.10^{-4}$ mole per mole of the dicarboxylic acid or ester-forming derivatives thereof employed in forming the glycol dicarboxylate.

References Cited

UNITED STATES PATENTS

| 2,465,319 | 3/1949 | Whinfield | 260—75 |
| 2,966,505 | 12/1960 | Lane | 260—429.5 |
| 2,980,719 | 4/1961 | Haslam | 260—429.5 |
| 3,047,515 | 7/1962 | Piirma | 260—75 |
| 3,056,818 | 10/1962 | Werber | 260—75 |
| 3,326,965 | 6/1967 | Schultheis | 260—75 |

OTHER REFERENCES

Hill: Fibres From Synthetic Polymers, Elsevier Polymer Series, vol. VI, TS 1548.5 H5, pp. 150 and 208, published 1953, Elsevier Publishing Co., New York, N.Y.

WILLIAM H. SHORT, *Primary Examiner.*

LOUISE P. QUAST, *Assistant Examiner.*

U.S. Cl. X.R.

260—429.5, 295, 475, 485, 45.7